US011062498B1

(12) United States Patent
Voss et al.

(10) Patent No.: US 11,062,498 B1
(45) Date of Patent: Jul. 13, 2021

(54) ANIMATED PULL-TO-REFRESH

(71) Applicant: Snap Inc., Santa Monica, CA (US)

(72) Inventors: Jeremy Voss, Los Angeles, CA (US); Christie Marie Heikkinen, Santa Monica, CA (US); Daniel Rakhamimov, Brooklyn, NY (US); Laurent Desserrey, Los Angeles, CA (US); Susan Marie Territo, Los Angeles, CA (US); Edward Koai, Santa Monica, CA (US); Joseph Timothy Fortier, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/730,363

(22) Filed: Dec. 30, 2019

(51) Int. Cl.
*G06T 13/80* (2011.01)
*G06F 3/0488* (2013.01)
*H04L 12/58* (2006.01)
*G06F 3/0485* (2013.01)

(52) U.S. Cl.
CPC ............ *G06T 13/80* (2013.01); *G06F 3/0485* (2013.01); *G06F 3/04883* (2013.01); *H04L 51/04* (2013.01); *H04L 51/18* (2013.01)

(58) Field of Classification Search
None
See application file for complete search history.

(56) References Cited

U.S. PATENT DOCUMENTS

| | | | | |
|---|---|---|---|---|
| 2010/0199180 | A1* | 8/2010 | Brichter | G06F 3/0485 715/702 |
| 2014/0108562 | A1* | 4/2014 | Panzer | H04L 51/02 709/206 |
| 2015/0033156 | A1* | 1/2015 | Marchant | G06F 9/54 715/760 |
| 2017/0064034 | A1* | 3/2017 | Vasthimal | H04L 67/306 |
| 2018/0213056 | A1* | 7/2018 | Chau | H04L 51/046 |
| 2018/0260924 | A1* | 9/2018 | Holt | G06Q 50/186 |
| 2020/0042742 | A1* | 2/2020 | Bailey | G06F 21/6254 |

\* cited by examiner

*Primary Examiner* — Jennifer Mehmood
*Assistant Examiner* — Jed-Justin Imperial
(74) *Attorney, Agent, or Firm* — Schwegman Lundberg & Woessner, P A.

(57) ABSTRACT

Aspects of the present disclosure involve a system comprising a computer-readable storage medium storing a program and method for animating a pull-to-refresh gesture. The program and method provide for receiving a pull gesture in a messaging application; selecting, in response to receiving the pull gesture, a set of users corresponding to contacts in the messaging application; and displaying a set of images for each user in the set of users, in association with refreshing screen content.

18 Claims, 12 Drawing Sheets

ANIMATED PULL-TO-REFRESH

TECHNICAL FIELD

The present disclosure relates generally to messaging applications, including configuring messaging applications to animate a pull-to-refresh gesture.

BACKGROUND

Messaging systems provide for the exchange of message content between users. For example, a messaging system allows a user to exchange message content with one or more other users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging application typically allows users to exchange content items (e.g., messages, images and/or video) with one another in a message thread. A messaging application may work in conjunction with a social network system which is configured to maintain the identity of users and their corresponding relationships (e.g., friend relationships).

In some cases, a user may wish to refresh a screen being displayed by the messaging application. For example, the user may perform a pull-to-refresh gesture on a list of users presented on the device screen. The pull-to-refresh gesture includes the user touching the screen, pulling the screen downward past a threshold pull distance, and then releasing the touch. In response to detecting the pull portion of the gesture, a messaging application typically provides an animation depicting the top edge of the screen being pulled down along with the pull gesture. In response to the release portion, the messaging application provides an animation for the screen to move back upwards, and for display of the updated content (e.g., an updated list of users). In some cases, an end user may wish to have a more engaging experience with respect to refreshing screen content.

The disclosed embodiments provide for additional animations to supplement a pull-to-refresh gesture. The messaging application displays an animated set of friends in association with the pull-to-refresh gesture. For example, the animated set of friends is selected randomly from a set of candidate friends. The candidate friends correspond to contacts with which the end user frequently messages, and/or recently messaged. The set of friends are animated with different facial expressions, accessories and/or other features relative to one another. In addition, different facial expressions, accessories and/or features are displayed for the friends through each stage of the pull-to-refresh gesture (e.g., the initial pull, pulling past the threshold pull distance, and release of the pull gesture).

Figure 1:
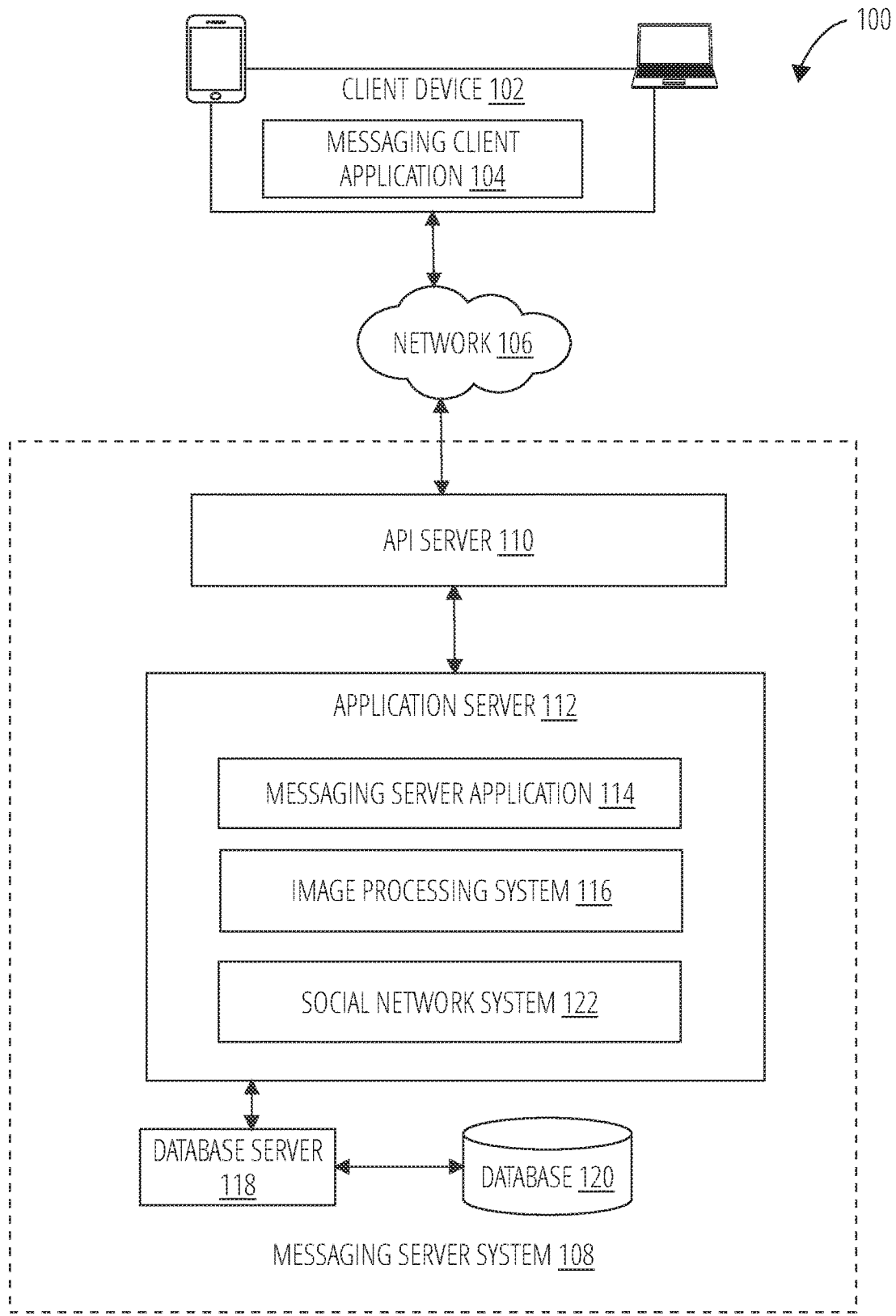
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between the messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., Story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called Stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
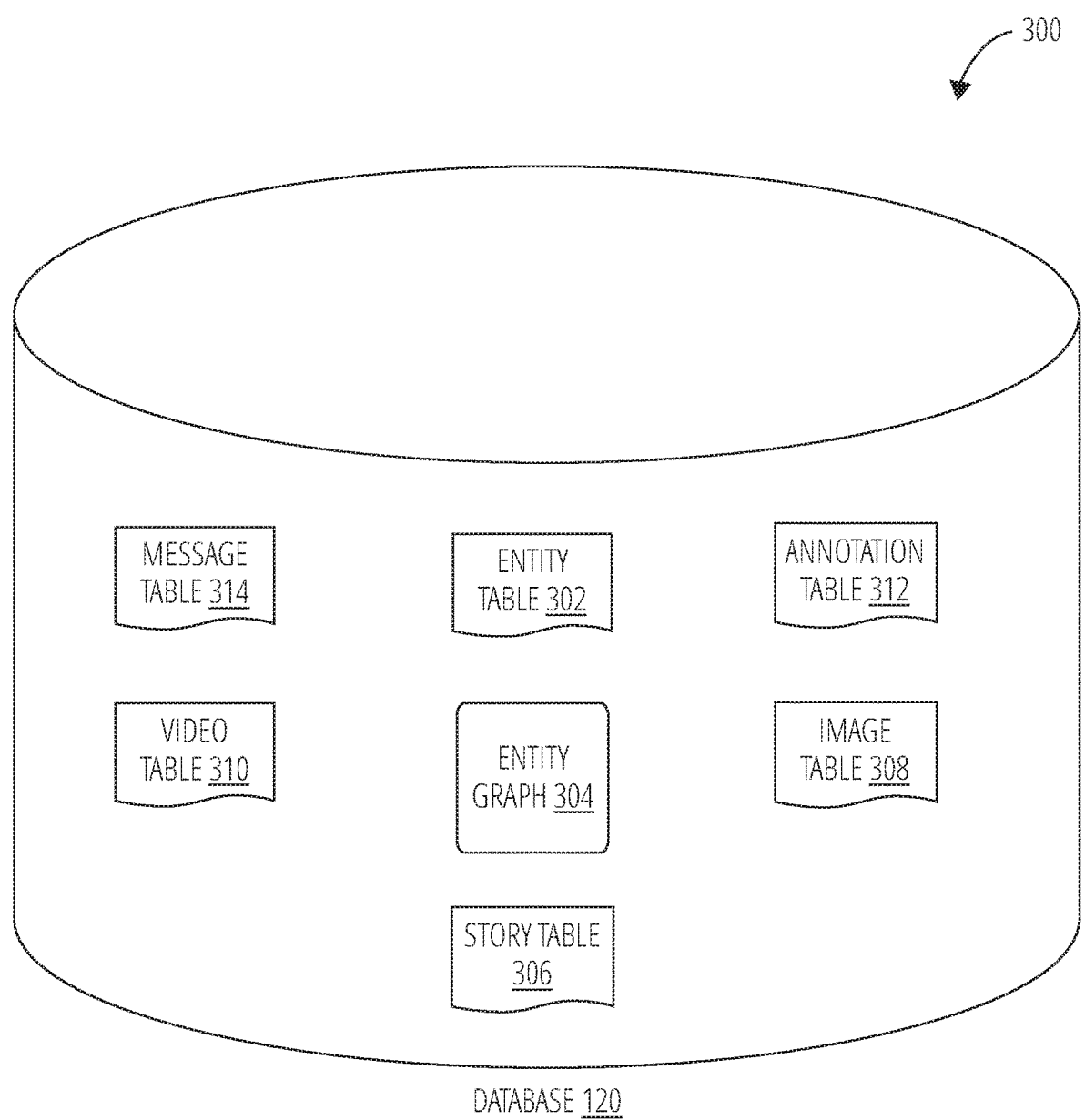
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user. Such other users may be referred to as the user's friends. In some embodiments, the social network system 122 may access location information associated with each of the user's friends to determine where they live or are currently located geographically.

Figure 2:
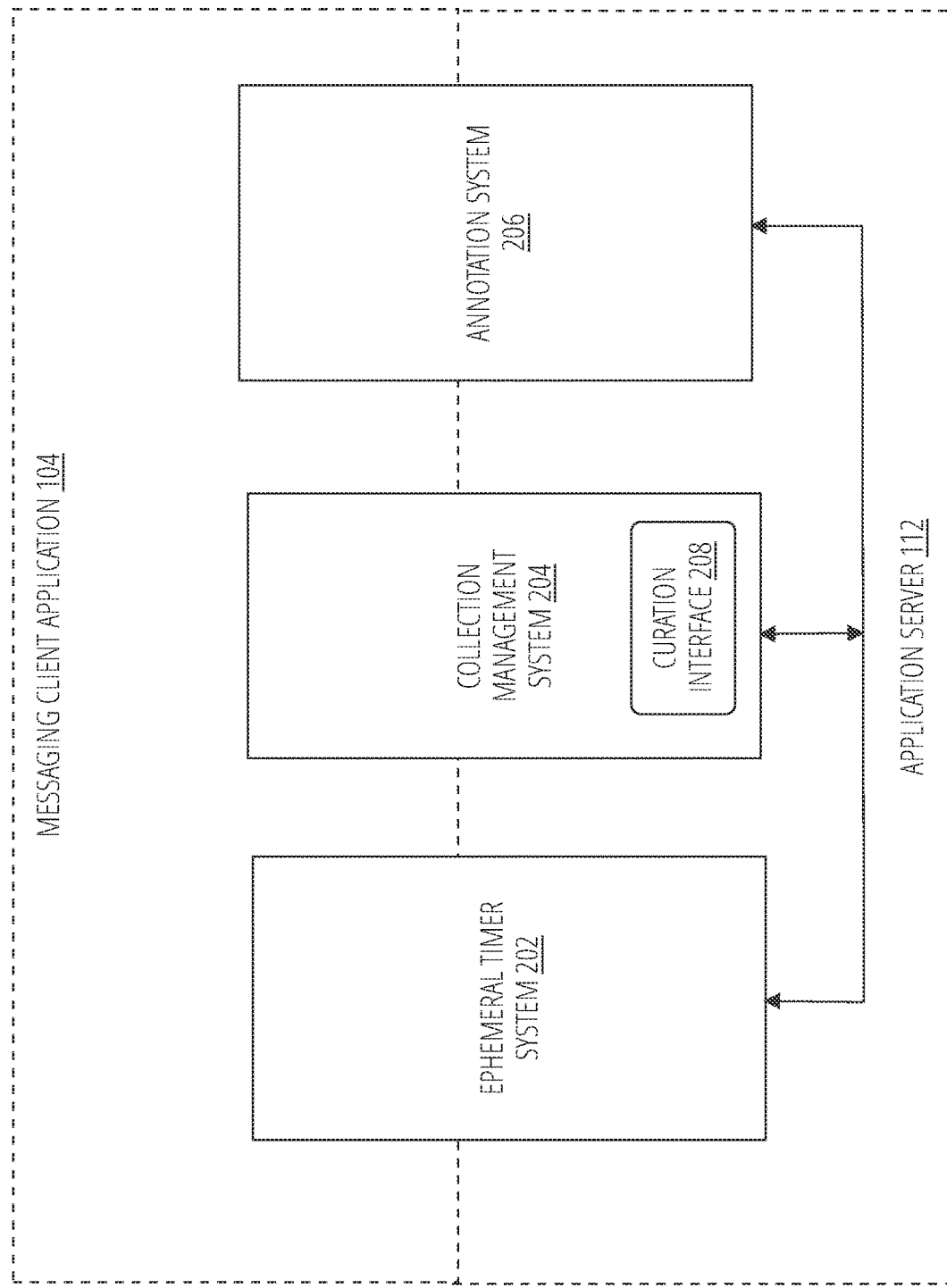
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the user interface of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client application 104, to contribute content to a particular live Story. The live Story may be identified to the user by the messaging client application 104, based on his or her location. The end result is a "live Story" told from a community perspective.

A further type of content collection is known as a "location Story", which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

Figure 4:
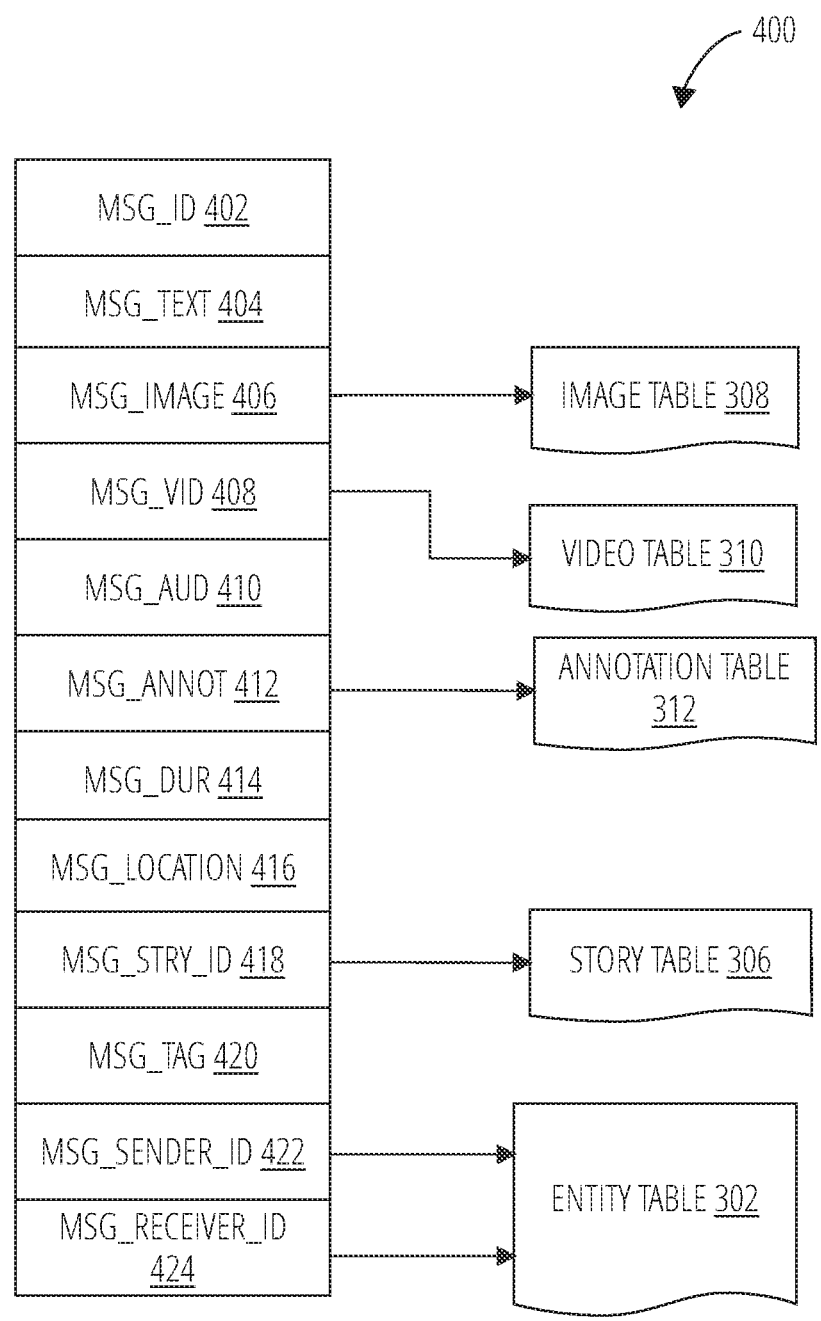
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
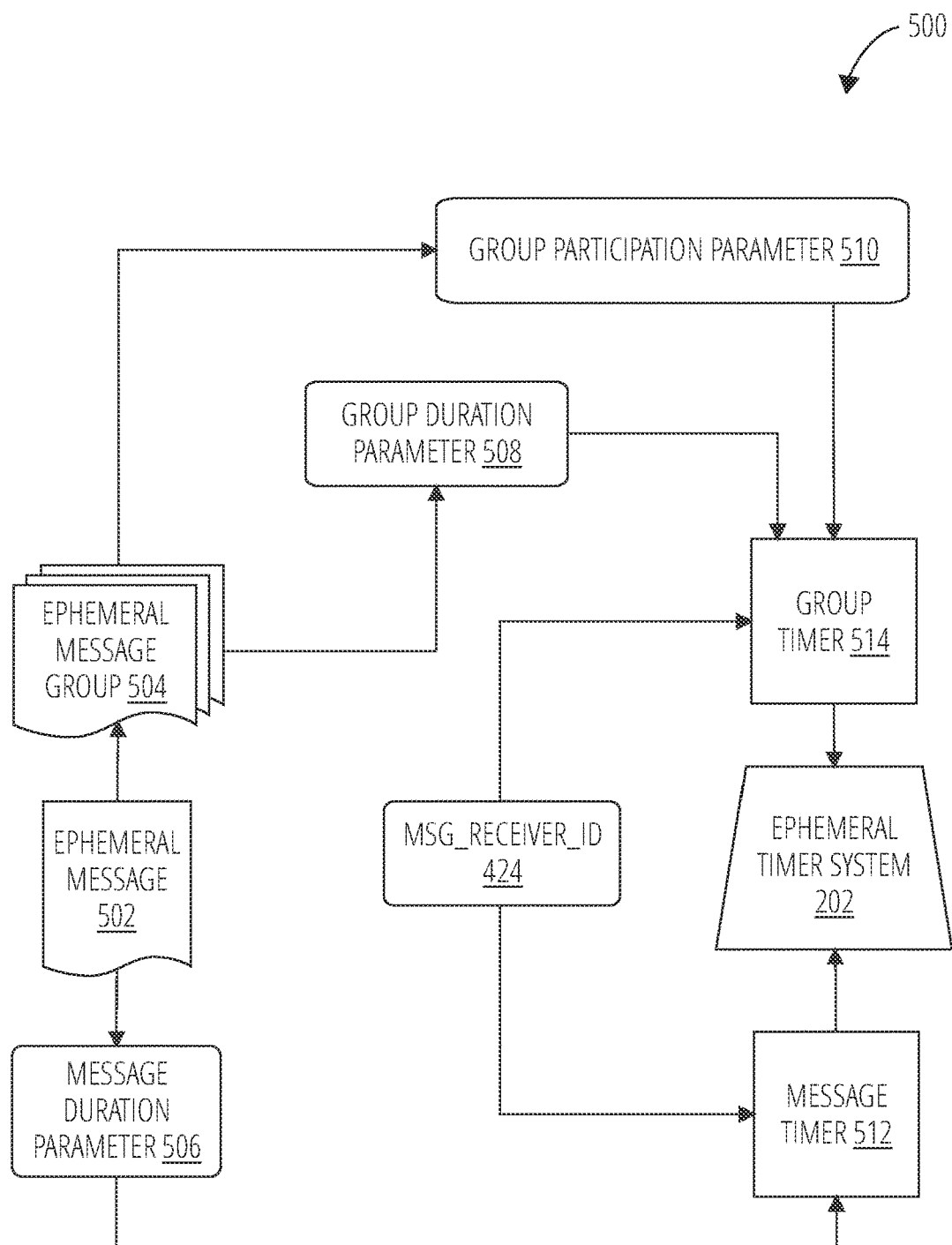
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
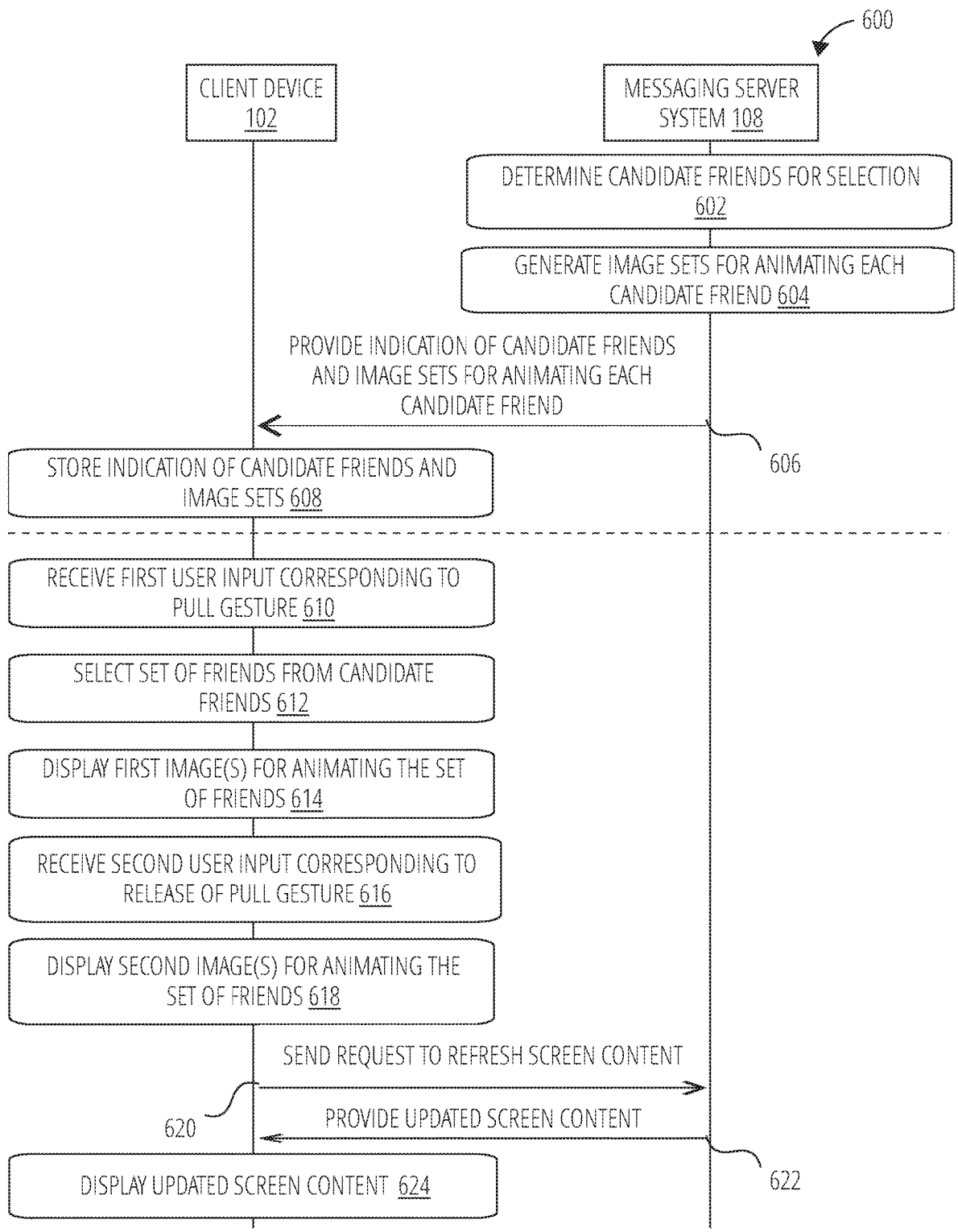
FIG. 6 is an interaction diagram illustrating a process for animating a pull-to-refresh gesture, in accordance with some example embodiments.

FIG. 6 is an interaction diagram illustrating a process 600 for animating a pull-to-refresh gesture, in accordance with some example embodiments. For explanatory purposes, the process 600 is primarily described herein with reference to the client device 102 and the messaging server system 108. However, the process 600 is not limited to the client device 102 and the messaging server system 108. Moreover, one or more blocks (or operations) of the process 600 may be performed by one or more other components of the client device 102, the messaging server system 108, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As noted above, the client device 102 has an instance of the messaging client application 104 installed thereon. The client device 102 is associated with a respective user of the messaging server system 108, and the user is associated with a user account of the messaging server system 108. Further, the user is identifiable by the messaging server system 108 based on a unique identifier (e.g., a messaging system identifier, email address and/or a device identifier) associated with the user account. In addition, the messaging server system 108 implements and/or works in conjunction with a social network system 122 which is configured to identify other users (e.g., friends) with which the user has relationships.

In the example of FIG. 6, operations 602-608 correspond to a first phase which relates to determining candidate friends and generating image sets for the candidate friends. Moreover, operations 610-624 correspond to a second phase for using the image sets for a selected subset of the candidate friends, to provide animations in association with a pull-to-refresh gesture. It is understood that the second phase may occur shortly after the first phase, or after an extended period of time after the first phase. As such, FIG. 6 includes a dashed line separating the first phase and the second phase for illustrative purposes.

A user of the messaging client application 104 may perform a user gesture (e.g., a pull-to-refresh gesture) indicating to refresh contents for a current screen. The messaging client application 104 has different screens/interfaces for which content can be refreshed in response to a pull-to-refresh gesture. For example, the messaging client application 104 includes a friends feed interface (e.g., discussed further below with respect to FIG. 7 and FIG. 8), a stories feed interface (not shown), and/or other types of interfaces configured to refresh in response to user input (e.g., a pull-to-refresh gesture).

For example, the friends feed interface includes a friends list representing contacts of the user (e.g., friends) with available messages for viewing, status updates, and the like. The stories feed interface includes a friends list and/or a subscription list (e.g., publishers such as merchants, social media influencers, businesses, advertisers, and the like) representing users with available content collections (e.g., Stories). Each list (e.g., friends list, subscription list) corresponds to a list of icons such as an image, avatar, video, emoji, label (e.g., text) and/or other representation of a respective user.

Each icon may be presented with additional information (e.g., an indication of available messages for viewing, status updates for the friends feed interface, and/or an indication of available content collections for the Stories feed interface).

Moreover, each list is displayed by the messaging server system 108 according to a predefined display order. Selection of a particular icon and/or the associated additional information within a list may provide for displaying the content (e.g., message, status, content collection) associated therewith.

As described herein, the messaging client application 104 displays animations (e.g., an animated set of friends) that accompany a pull-to-refresh gesture, to create a more engaging interface experience for the user. With respect to the first phase, the messaging server system 108 determines candidate friends for selection (block 602). The candidate friends correspond to a larger group friends from which the set of friends is selected for animating.

In some embodiments, the messaging server system 108 determines the candidate friends based on a strength of the relationship (e.g., friendship) between the user and the contacts (e.g., friends) of the user. For example, a stronger relationship may be determined based on the frequency and/or recency of messages exchanged between the user and each respective friend. Alternatively or in addition, the strength of the relationship may be indicated by the user (e.g., where the user specifies closest or "best" friends within the messaging client application 104). In some embodiments, the messaging server system 108 is configured to limit the number of candidate friends (e.g., eight friends), and to limit the number of friends within the set of friends (e.g., three friends). Moreover, the messaging server system 108 is configured to update the candidate friends on a periodic basis. In this way, the candidate friends are based on recent data, for example, with respect to frequency and/or recency of exchanged messages.

In some embodiments, it is possible that the number of candidate friends is smaller than the required number for a set of friends (e.g., where a given user has less than three total "best" friends). In such a case, the messaging client application 104 running on the client device 102 may simply provide a default animation in lieu of animating a set of friends in association with the pull-to-refresh gesture.

At block 604, the messaging server system 108 determines (or generates) image sets for animating each candidate friend. Each image set corresponds to a representation (e.g., icon, bitmoji, avatar or other type of representation) of a candidate friend. Moreover, the image sets may include multiple expression options (e.g., images for a happy expression option, other images for a surprised expression option, other images for a neutral expression option) for animating each candidate friend. In some embodiments, the messaging server system 108 is configured to generate the image sets based on a selected icon/avatar for the friend (e.g., as selected by the friend). The messaging server system 108 uses preset templates and poses that can be applied to a selected icon/avatar, in order to generate the image sets for each candidate friend.

The messaging server system 108 provides an indication of the candidate friends, and the image sets for animating each candidate friend, to the client device 102 (operation 606). The client device 102 stores the received indication and image sets (block 608). As noted above, in some embodiments, the indication and/or image sets are updated by the messaging server system 108 (e.g., periodically). These updates are sent to the client device 102, for local storage on the client device 102.

With respect to operations 610-624 corresponding to the above-noted second phase, the client device 102 receives first user input corresponding to a pull gesture (block 610). In some embodiments, a pull gesture may correspond to an initial part of a pull-to-refresh gesture. A pull-to-refresh gesture (or swipe-to-refresh) includes touching the screen of the client device 102 with a finger/stylus or pressing a button on a pointing device, pulling the screen downward (or sideways, for some horizontal lists) with the finger/pointing device past a threshold pull distance, and then releasing the touch/press, as a signal to the messaging client application 104 to refresh the contents of the screen. Thus, the pull-to-refresh gesture includes the pull gesture, followed by pulling past the threshold pull distance, and releasing the pull gesture.

At block 612, the messaging client application 104 running on the client device 102 selects a set of friends from the candidate friends locally stored on the client device 102. For example, the set of friends may correspond to a predefined number of friends (e.g., three friends) selected from the group of candidate friends (e.g., eight friends). In some embodiments, the selection of the set of friends is random. As such, the client device 102 uses a random number generator to select the set of friends from the candidate friends. Thus, in some embodiments, the set of friends corresponds to a random selection of close or "best" friends of the user.

At block 614, the messaging client application 104 running on the client device 102 displays first image(s) for animating the set of friends selected from the candidate friends. The first image(s) are included in the set of images stored for each friend, and relates to an initial stage of a pull-to-refresh gesture. In one or more embodiments, the first image(s) include a set of images, for each friend, providing respective frames displayed in sequence to provide an animation. For example, the first image(s) may depict an animation in which each friend in the set of friends pulls down a top edge of the screen with their hands, so as to correspond with the pull gesture (e.g., as discussed with respect to FIG. 7 below). Alternatively, the first image(s) may include a single image for each friend (e.g., pulling down the screen), which when displayed prior to the second image(s) described below, provide for animating the set of friends.

As noted above, the set of images stored for each candidate friend includes multiple expression options for animating the candidate friend (e.g., such that each candidate friend may be depicted with a happy facial expression, surprised facial expression, or neutral facial expression per animation). For each of the friends in the selected set, the client device 102 randomly selects an expression option for that friend. In some embodiments, for a selected set of three friends, the messaging client application 104 selects a different expression option for each friend. For example, the messaging client application 104 selects a happy expression for the first friend, a surprised expression for the second friend, and a neutral expression for the third friend.

As noted above, a complete pull-to-refresh gesture requires that the pull go past a threshold pull distance. In some embodiments, the first image(s) include additional image(s) for depicting the set of friends when the messaging client application 104 detects pulling past the threshold pull distance. For example, the additional image(s) depict a series of images corresponding to an animation (or alternatively, a single image) of the set of friends continuing to pull down from the top edge of the screen, but with updated facial expression (e.g., different phases of a happy, surprised or neutral expression based on the selected expression option) and accessories/features (e.g., as discussed with respect to FIG. 8 below).

At block 616, the messaging client application 104 running on the client device 102 receives second user input corresponding to release of the pull gesture, thereby completing the pull-to-refresh gesture (block 616). In response, the messaging client application 104 displays second image (s) for animating the set of friends (block 618). The second image(s) are included in the set of images stored for each friend, and relate to completing the pull-to-refresh gesture.

Similar to the first image(s), the second image(s) may correspond to a series of images corresponding to an animation, or a single image which when displayed after the first image(s), provide for the animation. For example, the second image(s) depict the set of friends releasing the top edge of the screen, so as to correspond with the release gesture (e.g., as discussed with respect to FIG. 9 below).

In some embodiments, if the pull-to-refresh gesture is not completed (e.g., if the gesture does not pass the predefined threshold pull distance and/or does not include a release), the messaging client application 104 only provides for display of the appropriate first image(s). If the pull-to-refresh gesture is completed (e.g., the gesture passes the predefined threshold pull distance, and includes a release), the messaging client application 104 provides for displaying the first image(s) and the second image(s) to animate the set of friends.

At operation 620, based on completion of the pull-to-refresh gesture, the client device 102 sends a request to refresh screen content to the messaging server system 108. In response, the messaging server system 108 provides updated screen content to the client device 102 (operation 622). For example, the updated screen content corresponds to an updated list (e.g., friends list, subscription list) within a friends feed interface and/or a stories feed interface. At block 624, the client device 102 displays the updated screen content. While FIG. 7 describes that the messaging client application 104 running on the client device 102 performs several of the operations 610-624 (e.g., corresponding to the second phase), it is understood that these operations may instead be performed by the messaging server system 108, such that the image sets are not stored on the client device 102.

By presenting the first image(s) and the second image(s) during different stages of the pull-to-refresh gesture, the messaging client application 104 animates a randomly-selected set of friends in association with refreshing screen content. Such animations may provide for a more engaging interface experience for the end user.

Figure 7:
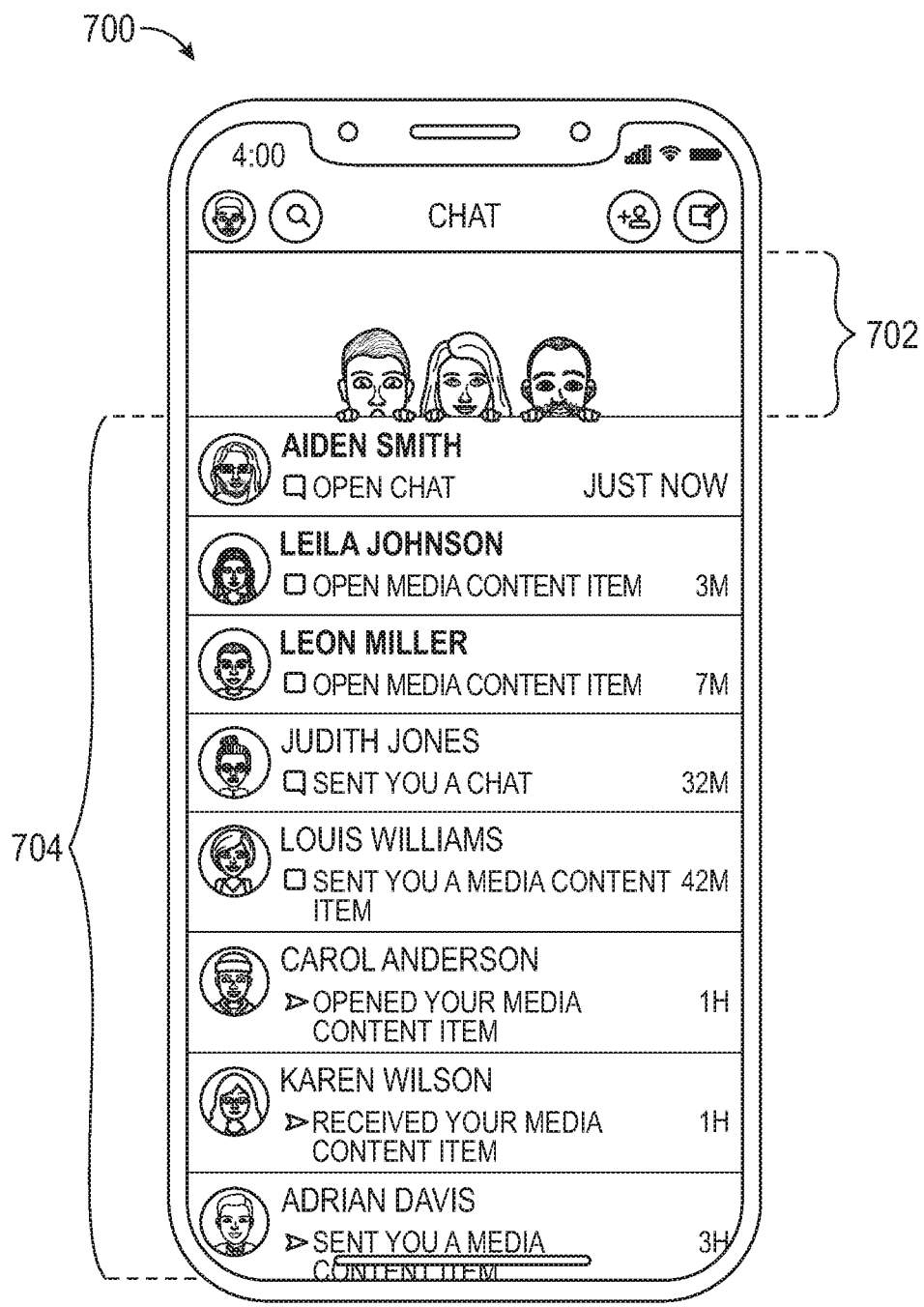
FIG. 7 illustrates a friends feed interface with animations of users corresponding to a pull gesture, in accordance with some example embodiments.
Figure 8:
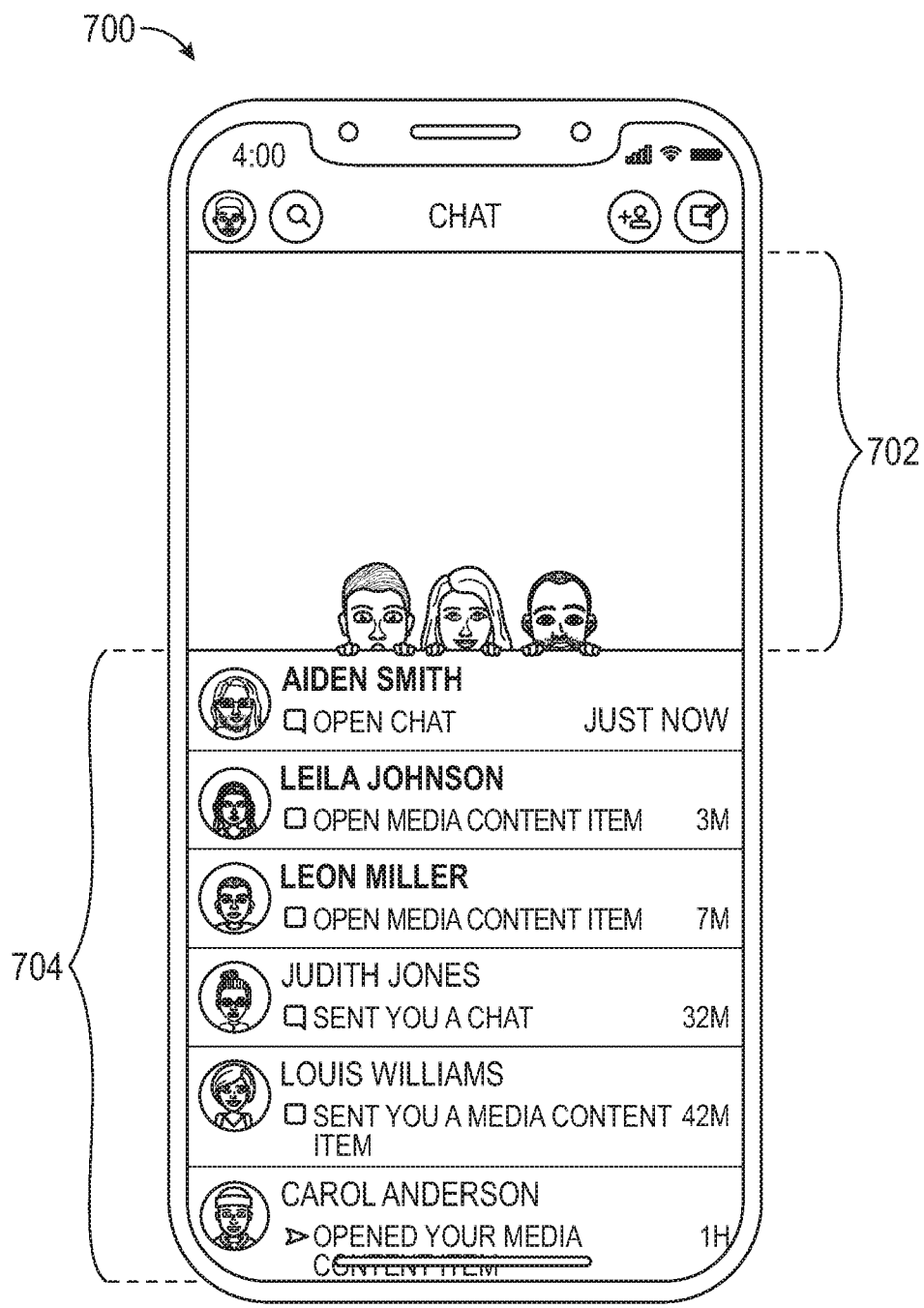
FIG. 8 illustrates a friends feed interface with animations of selected users corresponding to a pull gesture passing a threshold pull distance, in accordance with some example embodiments.
Figure 9:
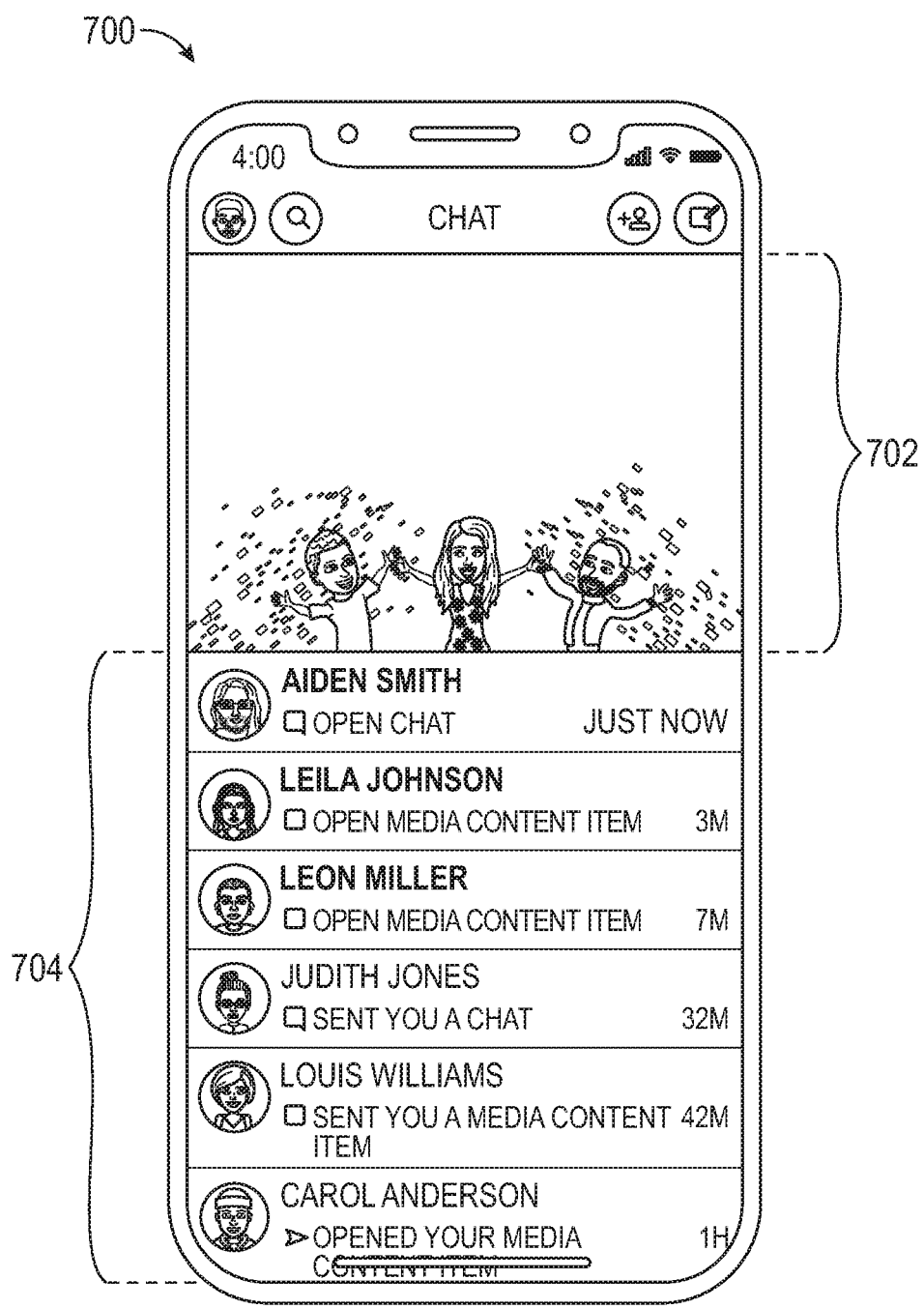
FIG. 9 illustrates a friends feed interface with animations of selected users corresponding to release of a pull gesture, in accordance with some example embodiments.

FIGS. 7-9 illustrate an example of animating a set of friends in association with a pull-to-refresh gesture. More specifically, FIG. 7 illustrates a friends feed interface 700 with animations of users (e.g., friends) corresponding to the initial pull gesture, in accordance with some example embodiments. The friends feed interface 700 includes a friends list 704 representing contacts of the user (e.g., friends). For each listed friend, the friends list 704 includes a name, icon (e.g., avatar) and status for that friend. For example, the respective statuses indicate one or more of available messages for viewing, status updates, and the like. Selection of a particular icon (and/or selection of the additional information) within the friends list 704 provides for displaying the content (e.g., message) or status associated with the corresponding friend.

In addition, the messaging client application 104 in conjunction with the messaging server system 108 provides for arranging the friends list 704 according to a display order. For example, the display order is based on a strength of the relationship (e.g., friendship) between the listed friend and the first user. A stronger relationship is determined based on the frequency and/or recency of messages exchanged between the listed friend and the first user. In another example, the strength of the relationship is based on a user-specified strength (e.g., where the first user had previously identified closest or "best" friends within the messaging client application 104).

The friends feed interface 700 further includes an animated set of friends 702 corresponding to the selected set of friends discussed above with respect to FIG. 6. In the example of FIG. 7, a set of three friends is represented by respective images (e.g., bitmojis) that appear to pull down a top edge of the screen. These images are displayed, for example, in response to the messaging client application 104 detecting a pull gesture. The three friends are positioned in a row along the top edge. In some embodiments, the left, center and right positions of the three selected users may be determined randomly by the messaging client application 104.

FIG. 8 illustrates the friends feed interface 700 with animations of selected users (e.g., friends) corresponding to a pull gesture passing a threshold pull distance, in accordance with some example embodiments. As noted above with respect to FIG. 6, a pull-to-refresh gesture requires a pull past the threshold pull distance. In response to the messaging client application 104 detecting a pull past the threshold pull distance, the animated set of friends 702 shown in FIG. 7 is updated in FIG. 8 to depict continued pulling down from the top edge of the screen. Moreover, the animated set of friends 702 in FIG. 8 includes different facial expressions and other added accessories/features (e.g., dog ears, laughter tears) relative to FIG. 7.

FIG. 9 illustrates the friends feed interface 700 with animations of selected users (e.g., friends) corresponding to release of a pull gesture, in accordance with some example embodiments. As noted above with respect to FIG. 6, release of the pull gesture is considered to complete the pull-to-refresh gesture in some embodiments. In response to the messaging client application 104 detecting a release of a pull gesture past the threshold pull distance, the animated set of friends 702 shown in FIG. 8 is updated in FIG. 9 to depict that the friends have released the top edge of the screen. Moreover, the animated set of friends 702 in FIG. 9 includes updated facial expressions and other added features (e.g., showing more of the bodies of the set friends, celebratory poses for the friends, and accompanying celebratory effects) relative to FIG. 8.

Figure 10:
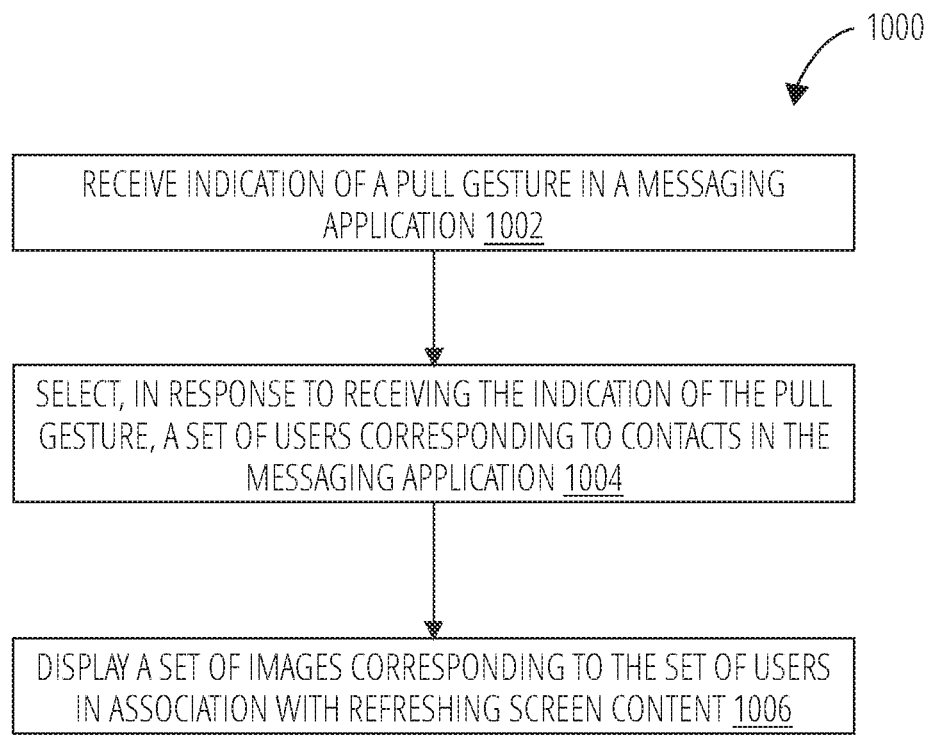
FIG. 10 is a flowchart illustrating a process for animating a pull-to-refresh gesture, in accordance with some example embodiments.

FIG. 10 is a flowchart illustrating a process 1000 for animating a pull-to-refresh gesture, in accordance with some example embodiments. For explanatory purposes, the process 1000 is primarily described herein with reference to the client device 102 of FIG. 1. However, one or more blocks (or operations) of the process 1000 may be performed by one or more other components of the client device 102, and/or by other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

The client device 102 receives a pull gesture in a messaging application (block 1002). The client device 102 selects, in response to receiving the pull gesture, a set of users corresponding to contacts in the messaging application (block 1004).

The set of users may be randomly selected from among a set of candidate users corresponding to contacts in the messaging application. The set of candidate users may be determined based on an amount of engagement with each user within the set of candidate users.

The client device 102 displays a set of images for each user in the set of users, in association with refreshing screen content (block 1006). The set of images may include a respective animation for each of the users. The set of images may include a respective bitmoji for each of the users.

The client device 102 may receive a release of the pull gesture. In response to receiving the release of the pull gesture, the client device 102 may provide a request for refreshing the screen content. In response to providing the request, the client device 102 may receive updated screen content for displaying in association with the set of images.

Providing the request may be further in response to detecting a threshold pull distance for the pull gesture. For each user in the set of users, a different image may be displayed with respect to initiating the pull gesture, pulling past the threshold pull distance, and releasing the pull gesture.

Figure 11:
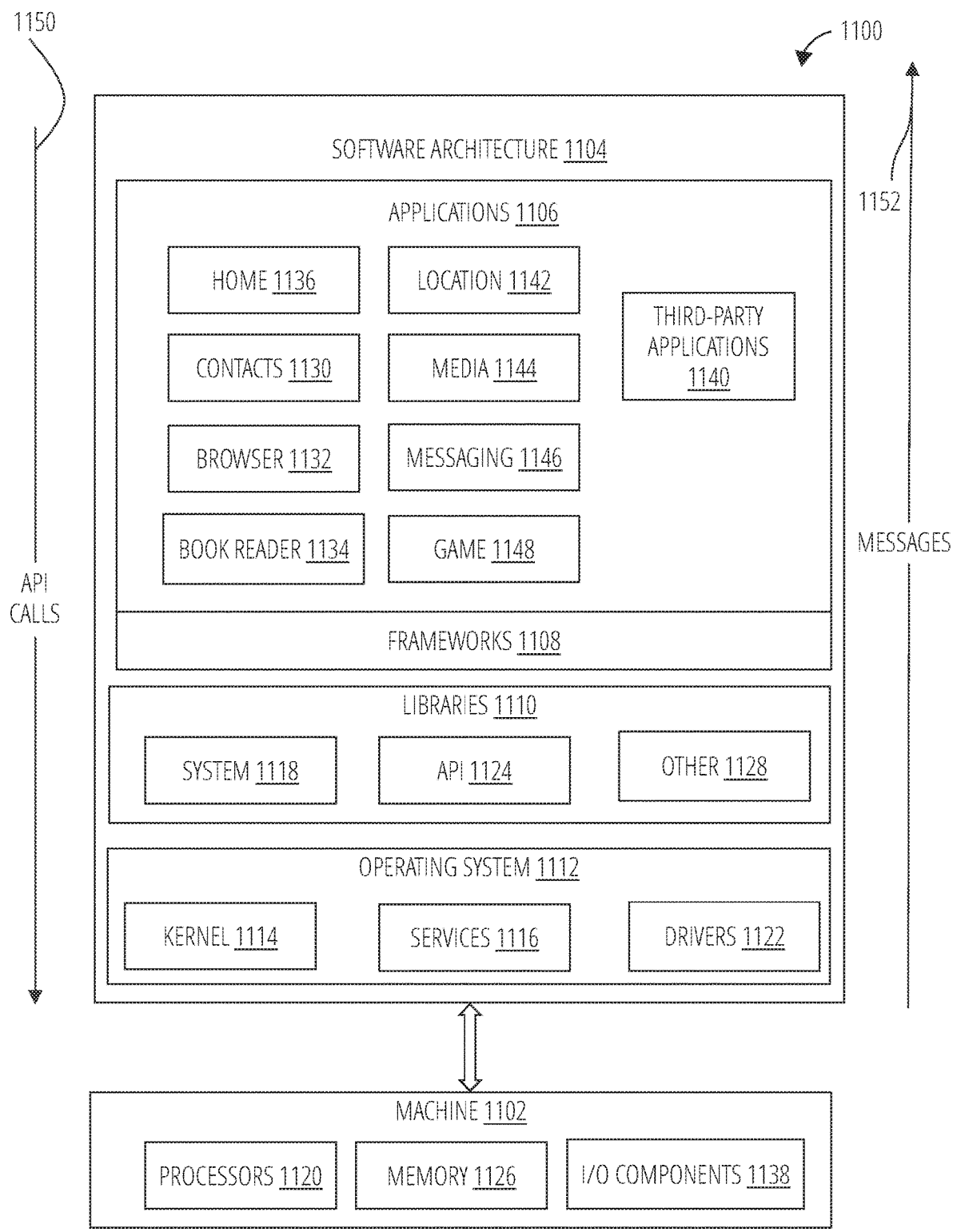
FIG. 11 is block diagram showing a software architecture within which the present disclosure may be implemented, in accordance with some example embodiments.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146 (e.g., corresponding to the messaging client application 104), a game application 1148, and a broad assortment of other applications such as third-party applications 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party applications 1140 (e.g., applications developed using the ANDROID™ or IOS™ software development kit (SDK) by an entity other than the vendor of the particular platform) may be mobile software running on a mobile operating system such as IOS™, ANDROID™, WINDOWS™ Phone, or another mobile operating system. In this example, the third-party applications 1140 can invoke the API calls 1150 provided by the operating system 1112 to facilitate functionality described herein.

Figure 12:
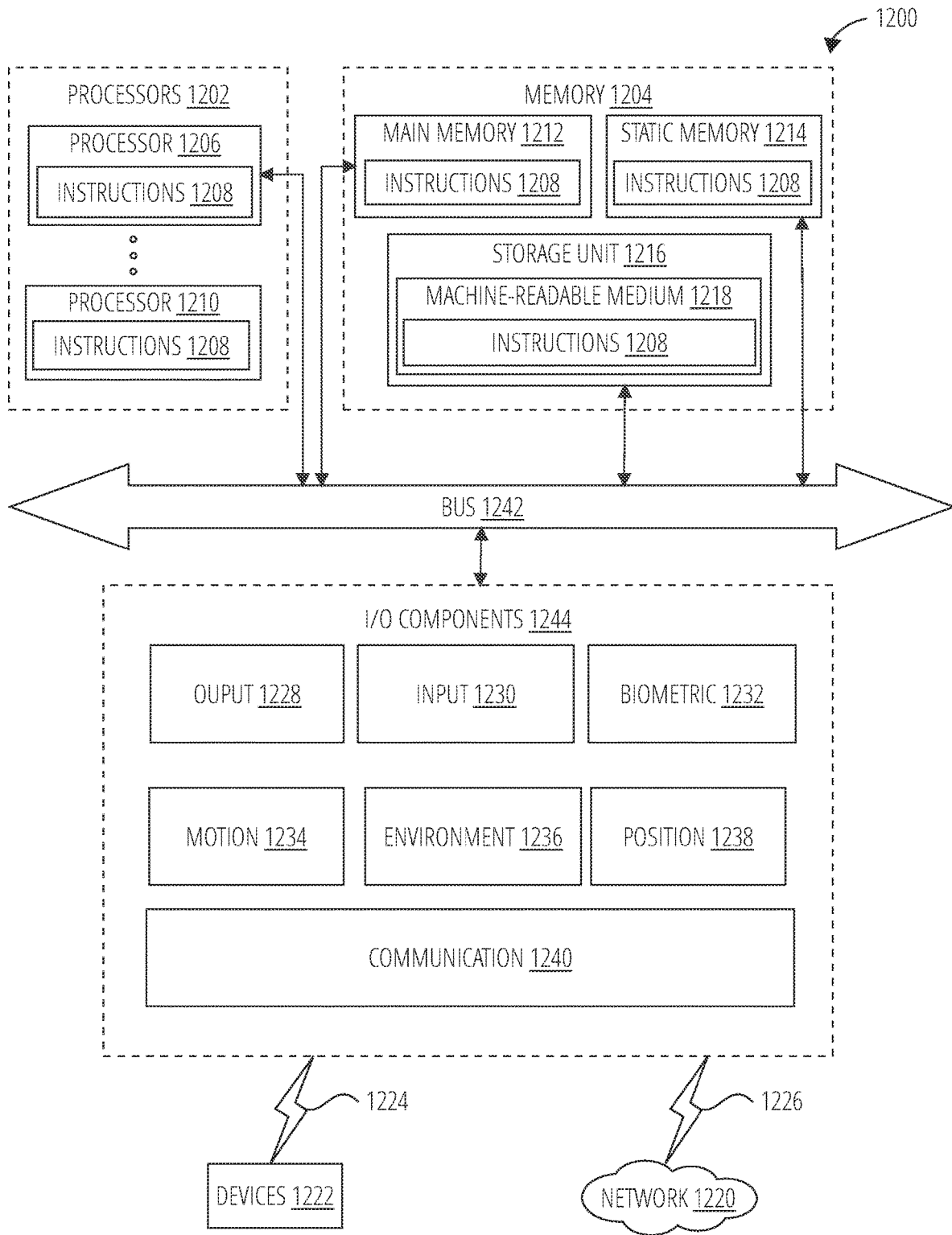
FIG. 12 is a diagrammatic representation of a machine, in the form of a computer system within which a set of instructions may be executed for causing the machine to perform any one or more of the methodologies discussed, in accordance with some example embodiments.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1244, which may be configured to communicate with each other via a bus 1242. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1242. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1244 may include a wide variety of components to receive input, provide output, produce output, transmit information, exchange information, capture measurements, and so on. The specific I/O components 1244 that are included in a particular machine will depend on the type of machine. For example, portable machines such as mobile phones may include a touch input device or other such input mechanisms, while a headless server machine will likely not include such a touch input device. It will be appreciated that the I/O components 1244 may include many other components that are not shown in FIG. 12. In various example embodiments, the I/O components 1244 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1244 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1244 further include communication components 1240 operable to couple the machine 1200 to a network 1220 or devices 1222 via a coupling 1226 and a coupling 1224, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1224 (e.g., a peer-to-peer coupling) to the devices 1222.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs). smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM). FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media." "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands". "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
receiving a pull gesture in a messaging application;
in response to receiving the pull gesture,
   selecting a set of users corresponding to contacts in the messaging application, and
   displaying, for each user in the set of users, a first image of the user performing a first action together with the other users in the set of users, the first action comprising pulling down a top edge of a screen, the first image being positioned above the top edge of the screen;
receiving a release of the pull gesture in the messaging application; and
in response to receiving the release of the pull gesture,
   displaying, for each user in the set of users, a second image of the user performing a second action together with the other users in the set of users, the second action relating to the release of the pull gesture, the second image being positioned above the top edge of the screen, and refreshing screen content with respect to the messaging application.

2. The method of claim 1, further comprising:

detecting a threshold pull distance for the pull gesture prior to the release of the pull gesture.

3. The method of claim 2, wherein for each user in the set of users a different image is displayed with respect to initiating the pull gesture, pulling past the threshold pull distance, and releasing the pull gesture.

4. The method of claim 1, wherein the first and second images correspond to a respective animation for each of the users.

5. The method of claim 1, wherein the first and second images correspond to a respective bitmoji for each of the users.

6. The method of claim 1, wherein the set of users is randomly selected from among a set of candidate users corresponding to contacts in the messaging application.

7. The method of claim 6, wherein the set of candidate users is determined based on an amount of engagement with each user within the set of candidate users.

8. The method of claim 1, wherein for each user in the set of users, the second image is displayed above the top edge, the top edge having been pulled down in association with the first image.

9. A computing apparatus, the computing apparatus comprising:

a processor; and a memory storing instructions that, when executed by the processor, configure the apparatus to:

receive a pull gesture in a messaging application;

in response to receiving the pull gesture, select a set of users corresponding to contacts in the messaging application, and display, for each user in the set of users, a first image of the user performing a first action together with the other users in the set of users, the first action comprising pulling down a top edge of a screen, the first image being positioned above the top edge of the screen;

receive a release of the pull gesture in the messaging application; and in response to receiving the release of the pull gesture, display, for each user in the set of users, a second image of the user performing a second action together with the other users in the set of users, the second action relating to the release of the pull gesture, the second image being positioned above the top edge of the screen, and refresh screen content with respect to the messaging application.

10. The computing apparatus of claim 9, wherein the instructions further configure the apparatus to:

detect a threshold pull distance for the pull gesture prior to the release of the pull gesture.

11. The computing apparatus of claim 10, wherein for each user in the set of users, a different image is displayed with respect to initiating the pull gesture, pull past the threshold pull distance, and releasing the pull gesture.

12. The computing apparatus of claim 9, wherein the first and second images correspond to a respective animation for each of the users.

13. The computing apparatus of claim 9, wherein the first and second images correspond to a respective bitmoji for each of the users.

14. The computing apparatus of claim 9, wherein the set of users is randomly selected from among a set of candidate users corresponding to contacts in the messaging application.

15. The computing apparatus of claim 14, wherein the set of candidate users is determined based on an amount of engagement with each user within the set of candidate users.

16. A non-transitory computer-readable storage medium, the computer-readable storage medium including instructions that when executed by a computer, cause the computer to:

receive a pull gesture in a messaging application;

in response to receiving the pull gesture, select a set of users corresponding to contacts in the messaging application, and display, for each user in the set of users, a first image of the user performing a first action together with the other users in the set of users, the first action comprising pulling down a top edge of a screen, the first image being positioned above the top edge of the screen;

receive a release of the pull gesture in the messaging application; and in response to receiving the release of the pull gesture, display, for each user in the set of users, a second image of the user performing a second action together with the other users in the set of users, the second action relating to the release of the pull gesture, the second image being positioned above the top edge of the screen, and refresh screen content with respect to the messaging application.

17. The computer-readable storage medium of claim 16, wherein the instructions further cause the computer to:

detect a threshold pull distance for the pull gesture prior to the release of the pull gesture.

18. The computer-readable storage medium of claim 17, wherein for each user in the set of users, a different image is displayed with respect to initiating the pull gesture, pull past the threshold pull distance, and releasing the pull gesture.

* * * * *